United States Patent [19]
Limberg

[11] 3,796,290
[45] Mar. 12, 1974

[54] BRAKE WHEEL CYLINDER AND BLEEDING SYSTEM

[75] Inventor: John F. Limberg, Rockford, Ill.

[73] Assignee: Wagner Electric Corporation, Newark, N.J.

[22] Filed: Sept. 25, 1972

[21] Appl. No.: 291,779

[52] U.S. Cl............... 188/352, 92/75, 188/364
[51] Int. Cl.............................................. B60t 11/30
[58] Field of Search ............... 188/352, 364; 92/75; 60/54 LM

[56] References Cited
UNITED STATES PATENTS

| | | | |
|---|---|---|---|
| 1,758,671 | 5/1930 | Loughead et al. ............... | 60/54.6 M |
| 2,054,653 | 9/1936 | Dick ................................ | 188/364 X |
| 2,684,131 | 7/1954 | Butterfield ...................... | 188/364 X |
| 2,752,755 | 7/1956 | Goepfrich ....................... | 60/54.6 M |
| 2,920,453 | 1/1960 | Franzi ............................. | 188/364 X |
| 3,066,768 | 12/1962 | Euga ............................... | 188/364 X |
| 3,339,401 | 9/1967 | Peters ............................. | 188/352 X |
| 3,403,602 | 10/1968 | Brandon, Jr. .................... | 92/75 X |

Primary Examiner—George E. A. Halvosa

[57] ABSTRACT

An abutment member is provided within the bore of a wheel cylinder for engagement with the wheel cylinder cups to prevent the movement thereof into blocking or overlapping engagement with the port hole opening in said bore upon vacuum bleeding of the brake system.

2 Claims, 5 Drawing Figures

PATENTED MAR 12 1974  3,796,290
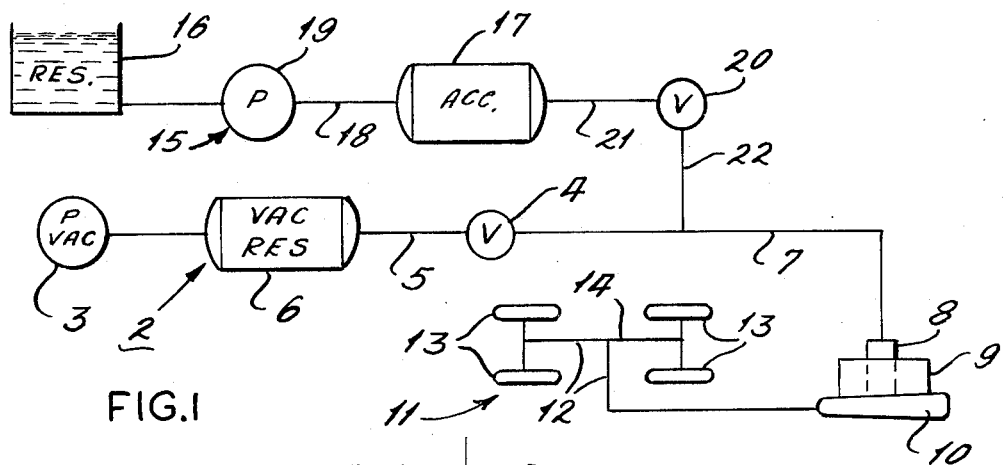
FIG.1
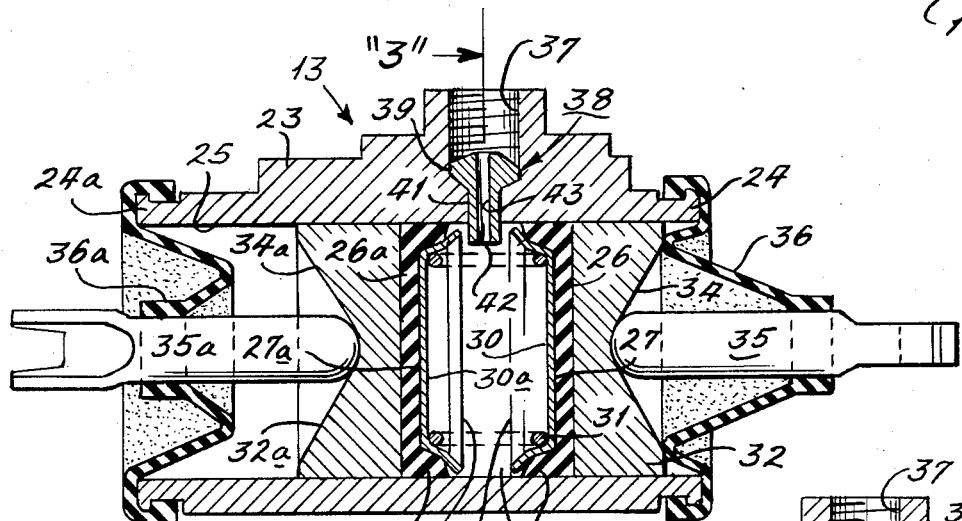
FIG.2
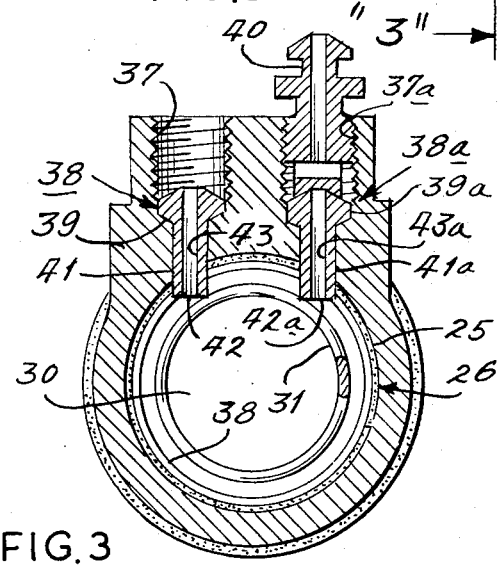
FIG.3
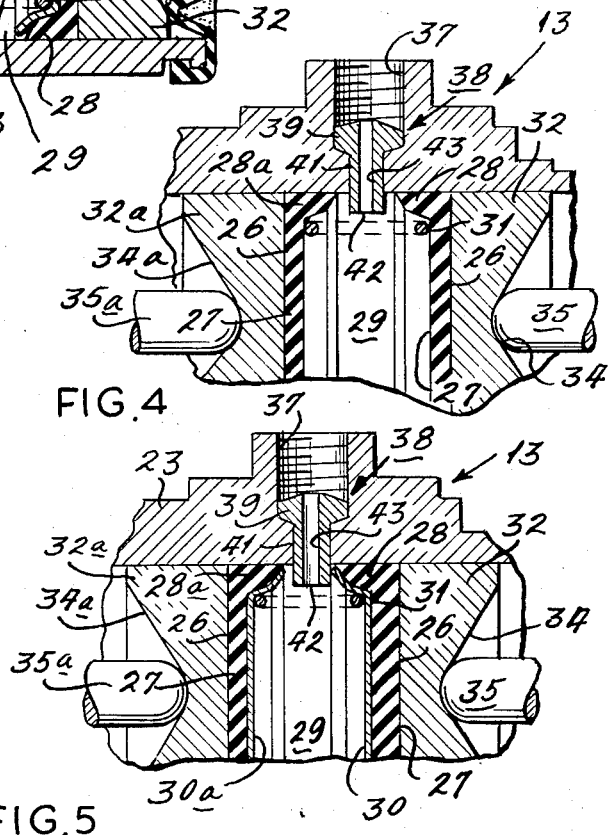
FIG.4
FIG.5

BRAKE WHEEL CYLINDER AND BLEEDING SYSTEM

This invention relates generally to wheel cylinders and in particular to a member for use therein to prevent port hole blockage.

BACKGROUND OF THE INVENTION

In the past, wheel cylinders employed on brakes of a vehicle hydraulic brake system were each manually bled on the production lines of original equipment manufacturers in order to purge said brake system of any air which might be trapped therein. In order to reduce the time and labor involved in the aforementioned manual brake system bleeding operations, some original equipment manufacturers have converted their vehicle production lines to vacuum bleeding or filling of the brake system wherein a vacuum is initially created or drawn in said brake system after which brake fluid is immediately introduced thereinto to fill the void created by the vacuum. In this manner, the brake system was completely filled with brake fluid obviating the necessity of manually bleeding the brake system wheel cylinders; however, one of the disadvantageous or undesirable features encountered was that the sealing cups of said wheel cylinders were movable in response to the created vacuum acting thereon toward positions in the wheel cylinder bores in blocking or overlapping engagement with the bore port hole opening thereby disrupting the vacuum bleeding process.

Several constructions have been contemplated or utilized in the past in an effort to overcome the problem of wheel cylinder port hole blockage by the wheel cylinder cups in response to vacuum bleeding, but none has been effective for various reasons, as set forth hereinbelow. For instance, one of the past constructions provided an annular shoulder integrally formed with the wheel cylinder and extending radially into the wheel cylinder bore for abutment with the wheel cylinder cups to prevent blocking engagement thereof with the port hole opening which extended through said shoulder to communicate with said bore; however, while such construction did prevent port hole blockage by the cups upon vacuum bleeding, several undesirable features involved in such construction obviated the use thereof. One of these undesirable features was that an entirely new wheel cylinder was needed to replace the present wheel cylinder on each brake design. Another of these undesirable features was that the burnishing and finishing operations on the wheel cylinder bore were doubled since the shoulder in the wheel cylinder bore necessitated a burnishing and finishing operation through each end of the bore. Another undesirable factor was that the length of the wheel cylinder was necessarily increased in order to provide tool run-out for the burnishing and finishing tools which was occasioned by the provision of the shoulder within the wheel cylinder bore. And another undesirable factor was that enough turbulence could not be created in the ingressing flow of brake fluid during the vacuum bleeding process to effectuate "smooth" or complete bleeding of the system when the aforementioned integral shoulder was provided in the wheel cylinder bore for cup abutment purposes.

Another construction contemplated or utilized in the past to overcome the problem of wheel cylinder port hole blockage by the wheel cylinder cups in response to vacuum bleeding was the provision of a wheel cylinder spring between said cups having a predetermined stacked height. When the wheel cylinder cups were actuated toward each other in response to the created vacuum, the wheel cylinder spring was compressed therebetween, and the stacked height of said wheel cylinder cup could block the port hole upon the concerted movement of said wheel cylinder cups between opposed extreme positions in the wheel cylinder bore. One of the undesirable features of the spring predetermined stacked height construction was that it was functionally related to wheel cylinder bore length and manifestly dictated a longer bore than was desirable from a design point of view. For instance, in the modern day brake package, the design emphasis is placed on attaining greater effective braking surface within a given brake drum, and this is accomplished by increasing the arc of the brake shoe and lining within said drum; therefore, when the shoe and lining arc is increased, the length of the wheel cylinder manifestly must be decreased. Another undesirable feature of the spring predetermined stacked height construction was that if the spring stacked height was great enough to prevent port hole blockage by the wheel cylinder cups in the relatively short length bore of the modern wheel cylinder, the wheel cylinder cups and springs in their stacked positions, in effect, "caged" the opposing wheel cylinder pistons and brake shoes on the brake. In other words, when so "caged," a tolerance build up, i.e., either on the plus or minus side of the designed "size" of the brake shoes, wheel cylinder cups, pistons and springs, the connecting links and the anchoring mechanisms of the brake, could effect either excessive or restrictive movement of the wheel cylinder cups, pistons and spring in the wheel cylinder bore. If the movement was excessive due to a tolerance build up on the minus side of "size," the wheel cylinder cups would, of course, block the port hole opening in the wheel cylinder bore obviating proper brake energization, and if the movement was restricted due to a tolerance build up on the plus side of "size," the brake could not be compressed enough to be received within its cooperating drum.

Another construction contemplated or utilized in the past to overcome the problem of wheel cylinder port hole blockage by the wheel cylinder cups in response to vacuum bleeding was the provision of a plug or filler within the wheel cylinder bore between the cups thereof to prevent the movement of said cups in response to the created vacuum into blocking position with the port hole; however, the plug or filler construction had the same undesirable features as the spring stacked height construction, as discussed hereinabove.

In addition to the foregoing, it should be noted that a construction for use in a wheel cylinder to prevent port hole blockage by the cups thereof in response to vacuum bleeding is indigenous to the original equipment manufacturer and his vacuum bleeding or filling process; however, in the replacement or aftermarket, such constructions are superfluous since the repair shops or garages employ the conventional pressure type bleeding process wherein the master cylinder is pressurized to purge the air trapped in the brake system through the wheel cylinder bleeder port.

SUMMARY OF THE INVENTION

The principle object of the present invention is to provide a wheel cylinder having port hole blockage preventing means for use therein and a system for vacuum bleeding and brake fluid filling of said wheel cylinder which overcomes the aforementioned undesirable or disadvantageous features of the aforementioned past constructions, and this, as well as other objects and advantageous features of the present invention will become apparent from the disclosure which follows.

Briefly, the invention includes a wheel cylinder having a housing with a bore therein, a fluid pressure port in said housing intersecting with said bore and defining an opening therein, sealing means for said bore and reciprocally movable therein, and seating means in said port including means extending through said opening into said bore for engagement with said sealing means, and passage means in said seating means communicating with said bore, said seating means being movable into engagement with said extension means in response to vacuum bleeding of said wheel cylinder to maintain the communication through said passage means. The invention also includes a system having a vacuum bleeding and brake fluid filling means selectively operable to respectively create vacuum in a brake circuit in which the aforementioned wheel cylinder is connected and inject brake fluid into said system and wheel cylinder to fill the void created by the vacuum.

RELATED ART

This patent application is related to U.S. Pat. application Ser. No. 229,881 filed Feb. 28, 1972 in the name of Michael E. Martin and assigned to the common assignee of this patent application which is a patentably distinct improvement.

BRIEF DESCRIPTION OF THE DRAWINGS

In the drawings which illustrate embodiments of the present invention and wherein like numerals refer to like parts wherever they occur:

FIG. 1 is a schematic diagram of a vacuum bleeding and brake fluid filling system for a vehicle hydraulic brake circuit embodied in the present invention;

FIG. 2 is a sectional view showing a wheel cylinder for the vehicle brake circuit of FIG. 1 also embodied in the present invention in cross-section;

FIG. 3 is a sectional view taken along line "3—3" of FIG. 2;

FIG. 4 is a fragmentary sectional view of the wheel cylinder of FIG. 2 alternatively showing the sealing cup thereof without the cup spreader; and FIG. 5 is a fragmentary sectional view of the wheel cylinder of FIG. 2 showing the sealing cup and spreader displaced in response to vacuum bleeding of said wheel cylinder.

DETAILED DESCRIPTION OF THE INVENTION

Referring now to the drawings in detail and in particular to FIG. 1, a vacuum bleeding and brake fluid filling system, indicated generally at 1 and well known in the art, is provided with a vacuum producing means or branch 2, such as the vacuum pump 3 or the like which is connected to a selectively operable valve 4 by a conduit 5 having a vacuum reservoir 6 interposed therein, and another flexible conduit 7 has one end connected with the valve 4 while the other end thereof connects with a probe or quick connecting fitting 8 which is insertable through the reservoir or supply tank portion 9 of vehicle master cylinder 10 into covering or sealing engagement about the compensating and supply port holes therein (not shown), as well known in the art. A conventional vehicle brake system or circuit, indicated generally at 11, is shown including the master cylinder 10 having conduit means 12 connected between the outlet port of said master cylinder and wheel cylinders 13 of the vehicle front brake assemblies (not shown), and branch conduit means 14 is connected between conduit means 12 and other wheel cylinders 13 of the vehicle rear brake assemblies (not shown), said brake circuits and assemblies being well known in the art. The system 1 is also provided with brake fluid pressurizing or injecting or filling means or branch 15, such as a brake fluid reservoir or source 16 which is connected to an accumulator 17 by a conduit 18 having a pump 19 interposed therein, and to complete said system, another selectively operable valve 20 has one side thereof connected with the accumulator by a conduit 21 while the other side thereof is connected by a conduit 22 with the conduit 7 between the valve 4 and probe fitting 8, as well known in the art.

Referring now to FIG. 2, the vehicle brake circuit wheel cylinders 13, of which only one is shown and described hereinafter for the sake of simplicity, are provided with a housing 23 having opposed end portions 24, 24a, and an axial bore 25 is axially provided through said housing intersecting with said opposed end portions thereof. Opposed sealing means, such as wheel cylinder cups 26, 26a for instance, are provided with disc shaped base portions 27, 27a slidably or reciprocally received in the bore 25, and annular lip portions 28, 28a are integrally formed with said base portions and sealably engaged with the bore 25. The cups 26, 26a define with the bore 25 an expansible chamber 29, and dish-shaped expander members or cup lip spreaders 30, 30a are respectively urged into abutting or seating engagement with said cups within said chamber by the negligible compressive force of a return spring 31. The force of the return spring 31 urges the cup base portions 27, 27a toward following or abutting engagement with opposed pistons 32, 32a which are slidably received in the bore 25, and the annular outer or peripheral portions 33, 33a of the spreaders 29, 29a are predeterminately radially spaced from the bore 25 and urge the cup lips 28, 28a toward sealing engagement with said bore. Opposed recesses or sockets 34, 34a are provided in the exterior portions of the pistons 32, 32a, and connecting or thrust links 35, 35a are drivingly connected between said piston recesses and the opposed brake shoes of the vehicle brake (not shown) on which the wheel cylinder 13 is mounted. Resilient boots 36, 36a are connected in sealing engagement between the housing 23 adjacent to the opposed ends 24, 24a thereof and the connecting links 35, 35a to prevent the entry of foreign particles into the bore 25. Referring now also to FIG. 3, substantially coplanar and spaced inlet and bleeder ports or passages 37, 37a are provided in the housing 23 intersecting with the bore 25 and connecting with the chamber 29, said inlet port receiving one of the conduits 12, 14 of the vehicle brake circuit 11. Tube seats or insert members, indicated generally at 38, 38a, are provided with head or sealing portions 39, 39a which are respectively press-fitted into the inlet and bleeder ports 37, 37a in sealing and displacement preventing engagement with the portions of the wheel cylinder housing 23 defining the sidewalls of said inlet and bleeder ports, and said tube seat head portions are provided for seating or sealing engagements with a vehicle brake circuit hose fitting or other fluid pressure delivery means (not shown) and a conventional bleeder screw 40, respectively, as is well known in the art. The tube seat head portions are integrally formed with reduced extensions or abutment portions 41, 41a which protrude through the inlet and bleeder ports 37, 37a a predetermined distance into the wheel cylinder bore and chamber 25, 29 so as not to interfere with the spring 31, and free end portions 42, 42a are respectively provided on said extensions within said wheel cylinder bore and chamber. To complete the description of the wheel cylinder 13, fluid pressure passages 43, 43a are provided in the tube seats 38, 38a between the head portions 39, 39a and free end portions 42, 42a to communicate the wheel cylinder chamber 29 with the inlet and bleeder ports 37, 37a, respectively, and it should be noted that said inlet and bleeder ports and said tube seats are generally coplanar with respect to an imaginary plane passing therethrough and substantially normal to the wheel cylinder bore 25. Of course, it is alternatively contemplated that the wheel cylinder 13, as shown in FIG. 4, is operative without the cup spreaders 30, 30a.

OPERATION

In the operation of the system 1, the vacuum and brake fluid valves 4, 20 thereof are initially in closed or off positions obviating communication or flow therethrough wherein the vacuum pump 3 is operative to evacuate the vacuum reservoir 6 to atmosphere through the conduit 5 and the brake fluid pump 19 is operative to predeterminately charge the accumulator 17 which flows thereto from the brake fluid reservoir 16 through the conduit 18. In order to vacuum bleed and pressure fill the vehicle brake circuit 11 on the original equipment manufacturer's vehicle assembly or production line, the probe 8 of the system 1 is manually inserted into the master cylinder reservoir 9 into covering sealing relation about the compensating and supply port holes thereof, and the vacuum valve 4 is then selectively actuated to an open or on position connecting the vacuum producing means 3 in communication with the vehicle brake circuit. In this manner, atmosphere is evacuated from the vehicle brake circuit 11 flowing from the wheel cylinder chamber 29 through the passage 37 of the wheel cylinders 13 into conduits 12, 14 and the master cylinder 10 of said vehicle brake circuit and therefrom through the probe 8, the conduit 7 and the vacuum producing means 3 to the atmosphere.

Of course, the vacuum created in the wheel cylinder chamber 29 and the ambient atmosphere establishes a pressure differential acting across the sealing means 26, 26a and pistons 32, 32a resulting in forces F, Fa which urge said sealing means and pistons axially inwardly into the wheel cylinder bore 25 contracting said chamber and thereby moving the spreader edges 33, 33a toward abutting engagement with the tube seat extensions 41, 41a. In this manner, the engagement of the spreader edges 33, 33a with the tube seat extensions 41, 41a prevents blockage of the tube seat passages 43, 43a and obviates further movement of the sealing means 26, 26a and pistons 32, 32a. Due to the tolerance difference between the component parts of the wheel cylinder 13 and also "stick-slip" conditions therebetween, it is contemplated that only one, instead of both sealing means 26, 26a and pistons 32, 32a may be moved in the bore 25 in response to the forces F, Fa acting thereon or it may be that one of said sealing means and piston moves further than the other thereof. However, as shown in FIG. 5, the force F acting on the sealing means 26 and piston 32 moves the peripheral edge 33 of the cup spreader 30 into abutting engagement with the tube seat extension 41; therefore, upon the movement of the spreader edge 33 into abutting engagement with the tube seat extension 41, further movement of the sealing means 26 and piston 32 in response to the force F is precluded and blockage of the passages 43, 43a in the tube seats 38, 38a is obviated.

When the vehicle brake circuit 11 is so evacuated or bled of the atmosphere therein, the vacuum valve 4 is selectively actuated toward its original closed or off position isolating the vacuum producing means 3 from said vehicle brake circuit, and the brake fluid valve 20 is selectively or simultaneously actuated toward an open or on position connecting the accumulator 17 in open pressure fluid communication with said vehicle brake circuit. In this manner, brake fluid flows or is injected under accumulator pressure through conduits 21, 22, 7 and the brake fluid valve 20, the probe 8 and the compensating and supply port holes of the master cylinder 10 into the conduits 12, 14 of the vehicle brake circuit 11 and the inlet port and chamber 37, 29 of the wheel cylinder 13 to completely fill with brake fluid the void created upon evacuation of said vehicle brake circuit, as previously discussed. The pressurized brake fluid so injected into the vehicle brake circuit acts on the sealing means 26, 26a of the wheel cylinder 13 urging them and the pistons 32, 32a toward their normal or at-rest positions within the wheel cylinder bore 25.

The alternative construction of the wheel cylinder 13, as shown in FIG. 4, operates in the same manner as previously described except that the leading edge of the lips 28, 28a of the cups 26, 26a are moved toward abutting engagement with the extensions 41, 41a of the tube seats 38, 38a upon the evacuation of the vehicle brake circuit 11.

From the foregoing, it is now apparent that a novel system 1 and wheel cylinder 13 are described hereinbefore, and changes or modifications as to the precise connections, configurations, shapes and details of the constructions set forth in the disclosure by way of illustration may be made by those skilled in the art without departing from the spirit of the invention.

The embodiments of the invention in which an exclusive property or privilege is claimed are defined as follows:

1. A hydraulic brake wheel cylinder adapted for selective connection with a vacuum bleeding system comprising a housing having opposed ends, an axial bore in said housing intersecting with said opposed ends, a pair of opposed force transmitting pistons slidable in said bore between said opposed ends, a pair of opposed sealing cups respectively slidable in said bore for driving engagement with said pistons including a pair of opposed sealing lips in sealing engagement with said bore, an expansible chamber in said bore between said opposed sealing cups, a pair of opposed spreader members in said chamber and respectively engaged with said sealing cups including a pair of annular portions engaged with said lips and urging said lips toward sealing engagement with said bore, a spring in said chamber biased between said spreader members urging said spreader members toward engagement with said sealing cups and urging said sealing cups toward engagement with said pistons, respectively, a pair of spaced ports in said housing substantially in the same plane normal to the axis of said bore and respectively intersecting with said bore between said sealing cups, a pair of tube seat members including a pair of head portions respectively disposed within said ports in sealing and displacement preventing engagement with said housing, a pair of extensions integral with said head portions and protruding through said ports into said chamber, a pair of free end portions on said extensions within said chamber and predeterminately spaced from interferring engagement with said spring, respectively, and a pair of passages in said tube seat members intersecting with said head portions and free end portions and communicating said ports with said chambers, a bleeder screw removably secured in one of said ports and engaged with one of said tube seat head portions about one of said passages to normally interrupt communication therethrough between said one port and said chamber, the other of said ports being adapted for selective connection with said vacuum bleeding system to evacuate said chamber through the other of said passages, and a pair of opposed annular edge portions on said spreader members predeterminately spaced from said bore for abutting engagement with said extensions, at least one of said pistons, sealing cups and spreader members being substantially concertedly movable in response to a fluid pressure differential acting thereacross against said spring to engage at least one of said spreader member edge portions with said extensions and prevent blockage of said other passage when said other port is selectively connected with said vacuum bleeding system to evacuate said chamber.

2. In a vacuum bleeding and brake fluid filling system for a vehicle hydraulic brake circuit, vacuum creating means selectively connected with said circuit and operable generally to create a vacuum for evacuating said circuit, brake fluid filling means selectively connected with said circuit and operable generally to introduce brake fluid into said circuit to fill the void created therein upon the evacuation of said circuit, said circuit including at least one brake operating wheel cylinder having a housing, a bore in said housing, a pair of opposed brake actuating pistons slidable in said bore, a pair of opposed sealing cups slidable in said bore for driving engagement with said pistons including a pair of opposed annular sealing lips in sealing engagement with said bore, an expansible chamber in said bore between said sealing cups, a pair of opposed spreader members in said chamber respectively engaged with said sealing cups including a pair of annular peripheral portions respectively engaged with said sealing lips and urging said sealing lips toward sealing engagement with said bore, a spring in said chamber biased between said spreader members urging said spreader members toward engagement with said sealing cups and said sealing cups toward engagement with said pistons, respectively, a pair of spaced ports in said housing substantially in the same plane normal to said bore and respectively intersecting with said bore between said sealing cups, a pair of tube seat members including a pair of head portions respectively disposed within said ports in sealing and displacement preventing engagement with said housing, a pair of extensions integral with said head portions and protruding through said ports into said chamber, a pair of free end portions on said extensions within said chamber and predeterminately spaced from interferring engagement with said spring, and a pair of passages in said tube seat members intersecting with said head portions and free end portions and communicating said ports with said chambers, respectively, a closure member removably secured in one of said ports and engaged with one of said head portions about one of said passages to normally interrupt communication therethrough between said one port and chamber, the other of said ports being connected in said circuit, and a pair of opposed annular edges on said peripheral portions of said spreader members predeterminately spaced from said bore within said chamber for abutting engagement with said extensions, respectively, at least one of said pistons, sealing cups and spreader members being concertedly movable in response to a fluid pressure differential acting thereacross against said spring to engage at least one of said spreader member edges with said extensions and prevent blockage of said other passage when the circuit is evacuated.

* * * * *